Patented Aug. 7, 1945

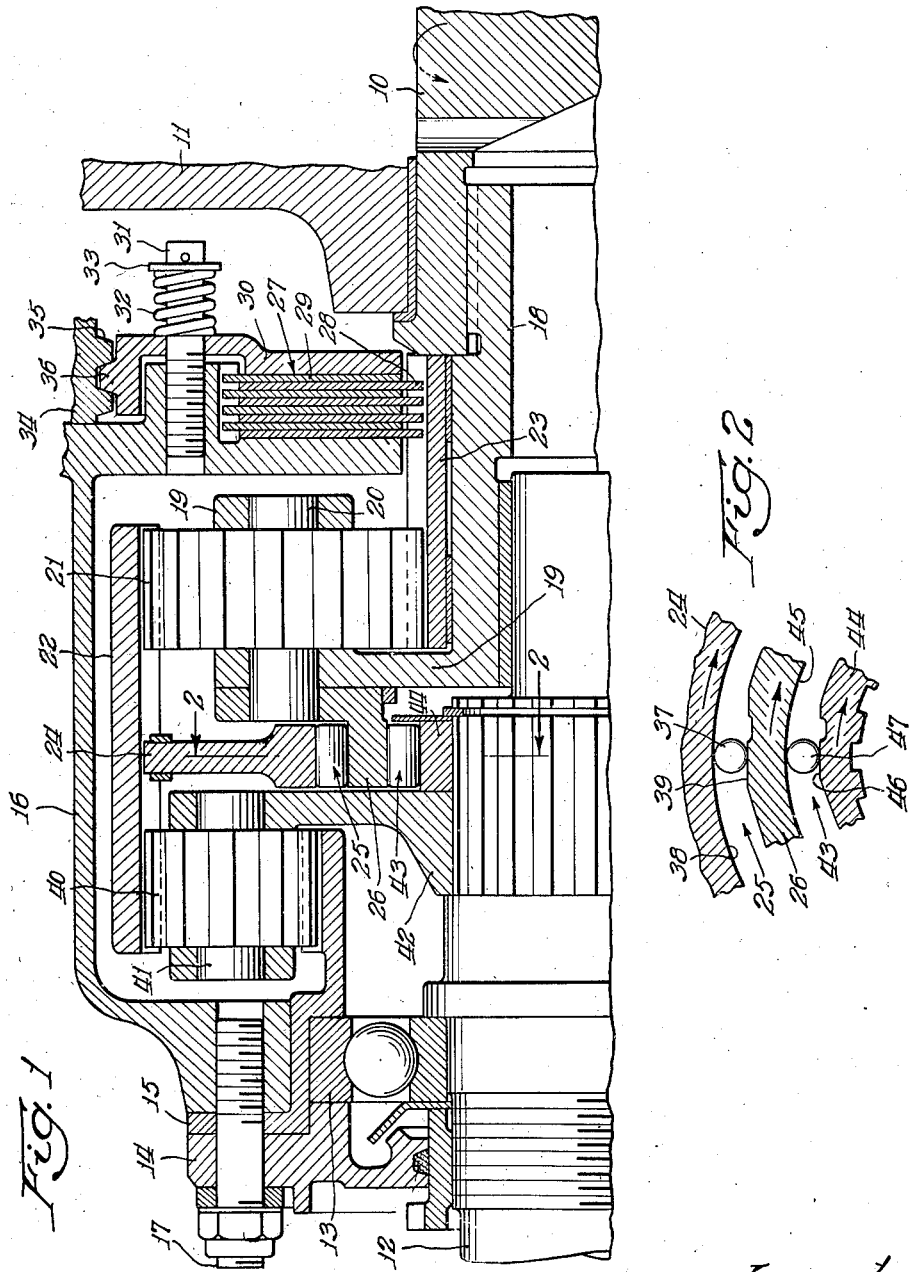

2,380,927

UNITED STATES PATENT OFFICE 2,380,927

TRANSMISSION

Carl J. Conkle, Muncie, Ind., assignor to Borg-Warner Corporation, Chicago, Ill., a corporation of Illinois Application May 5, 1943, Serial No. 485,729

8 Claims. (Cl. 74—290)

My invention relates to transmissions and more particularly to transmissions which are suitable for use in airplanes between the engines and propellers thereof and function to drive the propellers at lower than engine speed.

In a co-pending application of William E. Moffitt, Serial No. 359,987, filed October 7, 1940, there is described a two speed airplane transmission which includes a pawl or dog adapted to enter and interengage in an opening or window in another element for shifting the transmission into high speed ratio and which includes a one-way brake on an element for taking the reaction of gearing in the transmission for providing a low speed ratio and friction braking means for that element of the gearing for taking coast load, that is, the load due to the action of a propeller on the driven shaft acting as a flywheel and driving the driving shaft at low gear ratio.

It is an object of my invention to provide a transmission suitable for use in airplanes which is of such construction that in order to shift the transmission from one speed ratio to another, only a single operator, preferably a brake, need be actuated, as distinguished from the two operators, the dog and the friction brake, provided for shifting the Moffitt transmission, and with the transmission being such that there is a connection between the driving and driven shafts such that a propeller on the driven shaft may act as a flywheel for an engine connected with the driving shaft, no matter at which speed ratio the transmission may be set to drive the driven shaft.

In its preferred form, my improved transmission comprises an input shaft, an output shaft, a planetary underdrive unit for driving the output shaft, a one-way clutch between the input shaft and underdrive unit for completing a low speed ratio power train between the shafts and through the underdrive unit, an overdrive unit operatively connectible between the input shaft and the underdrive unit for driving the latter unit and thereby providing a high speed ratio power train between the shafts, and a one-way clutch between the shafts whereby the output shaft may drive the input shaft for maintaining an engine connected with the input shaft in operation when the propeller connected with the output shaft is rotating.

My invention consists of the novel constructions, arrangements and devices to be hereinafter described and claimed for carrying out the above-stated objects and such other objects as will appear from the following detailed description of a certain preferred embodiment of the invention illustrated in the accompanying drawing, wherein:

Fig. 1 is a longitudinal sectional view of a transmission embodying the principles of my invention; and Fig. 2 is a sectional view taken on line 2—2 of Fig. 1.

Like characters of reference designate like parts in the several views.

The illustrated transmission comprises an input or driving shaft 10, which is journaled in a stationary part 11 constituting a portion of the housing for the transmission, and an output or driven shaft 12, which is journaled by means of a ball bearing 13 with respect to a transmission housing portion 14 and a sun gear member 15. The sun gear member 15 and the housing portion 14 are bolted together and to a transmission housing portion 16 by means of a plurality of bolts 17 (one being shown in the drawing) as shown. An intermediate shaft 18 is provided between the shafts 10 and 12, and the shaft 18 is splined to the shaft 10 and is piloted on the shaft 12 as shown. The shaft 10 is adapted to be connected to and to be driven by an airplane engine (not shown), and the shaft 12 is adapted to carry and to drive an airplane propeller (not shown).

A flange-like portion 19 is provided on the shaft 18, and the portion 19 carries a plurality of stub shafts 20 (one being shown in the drawing) as shown. A planet gear 21 is rotatably disposed on each of the stub shafts 20, and the planet gears are in mesh with a ring gear 22 and a sun gear 23. The ring gear 22 has a member 24 splined thereto, and the member 24 is connected by means of a one-way clutch 25 with a member 26 which is fixed with respect to the flange portion 19. The sun gear 23 is rotatably mounted on the shaft 18, and a brake 27 is provided for arresting the rotation of the sun gear. The gears 21, 22, and 23 and the brake 27 together form a planetary overdrive unit as will be hereinafter described.

The brake 27 comprises discs 28 and discs 29 between the discs 28, with the discs 29 being splined to the housing portion 16 and the discs 28 being splined to the sun gear 23. A pressure member 30 is provided for forcing the discs 28 and 29 together, and bolts 31 (one being shown in the drawing) are provided passing through openings in the member 30 and functioning to hold the member 30 against rotation. A spring 32 is provided on each of the bolts 31 between a washer 33 suitably held against outward movement on the bolt and the pressure member 30, and the springs function to force the member 30 to the left as seen in Fig. 1 for pressing the discs 28 and 29 together and thereby engaging the brake 27. A member 34, which is rotatable with respect to the housing portion 16 but is held against movement outwardly away from the housing portion by any suitable means (not shown), is provided, and the member 34 is formed with a thread 35 thereon. The pressure member 30 is provided with a thread 36 in threaded engagement with the thread 35, and the arrangement is such that the pressure member 30 may be moved to the right as seen in Fig. 1 to disengage the brake 27 by rotating the member 34 in one direction and the member 30 may be moved to the left as seen in the figure by rotation of the member 34 in the opposite direction whereby the springs 32 will again function to maintain the brake 27 engaged. As is apparent, when the brake 27 is disengaged, there is no drive from the shaft 18 through the planet gears 21 to the ring gear 22; however, when the brake 27 is engaged, the sun gear 23 is thereby held stationary and the planet gears 21 function to drive the ring gear 22 at a speed higher than that of the shaft 18.

The one-way clutch 25 comprises rollers 37, a cylindrical surface 38 formed on the member 24 and cammed surfaces 39 formed on the member 26. The clutch 25, as is apparent, functions, when the brake 27 is disengaged and the ring gear 22 is not being driven at an overdrive speed with respect to the shaft 18, to drive the ring gear 22 at the same speed as the shaft 18 with the rollers 37 wedging between the opposite surfaces 38 and 39. When the ring gear 22 is driven at an overdrive speed by the planet gears 21, the clutch 25 overruns with the rollers 37 being out of wedging relation with the surfaces 38 and 39.

A plurality of planet gears 40 (one being shown in the drawing) are provided in mesh with the ring gear 22 and the sun gear member 15. Each of the planet gears 40 is rotatably mounted on a stub shaft 41 which is carried by a member 42 splined to the driven shaft 12. The ring gear 22, which, as has been hereinbefore described, is adapted to be driven either at the speed of the shaft 18 by means of the one-way clutch 25 or at an overdrive speed with respect to the shaft 18 by means of the planet gears 21; the sun gear member 15, which is stationary with respect to the transmission housing portions 14 and 16; and the planet gears 40 constitute an underdrive, as is apparent, for driving the driven shaft 12 at a speed less than that of the ring gear 22. It will be noted that the ring gear 22 functions both as a ring gear with respect to the plane gears 21 and with respect to the planet gears 40 and that the ring gear functions to connect the underdrive unit with both the one-way clutch 25 and also the overdrive unit comprising the gears 21, 22 and 23.

A one-way clutch 43 is provided between the member 26 and the output shaft 12. The one-way clutch comprises a member 44 splined to the driven shaft 12, a cylindrical surface 45 provided on the member 26, cammed surfaces 46 formed on the member 44, and a plurality of rollers 47 between the surfaces 45 and 46. One-way clutch 43 functions, as is apparent, to drive the member 26 in the same direction of rotation as the shafts 10 and 12 rotate when the member 44 is driven in such direction, with the rollers wedging between the surfaces 46 and 45.

The illustrated transmission provides two speed ratios for driving the driven shaft 12 when the driving shaft 10 is rotated. When the brake 27 is disengaged, the shaft 12 is driven at low speed ratio, and the drive is from the shaft 10 through the shaft 18, the flange portion 19, the member 26, the one-way clutch 25, the member 24, the ring gear 22, the underdrive comprising the gears 22, 40 and 15, and the member 42 to the shaft 12. When the brake 27 is engaged, the driven shaft 12 is rotated at high speed ratio, and the drive is then from the shaft 10 through the shaft 18, the flange portion 19, the overdrive unit comprising the gears 23, 21, and 22, the underdrive unit comprising the gears 22, 40 and 15 and the member 42 to the shaft 12. When the shaft 12 is thus driven in high speed ratio, the one-way clutch 25 overruns as is apparent. It will be noted that at both low and high speed ratios, the shaft 12 rotates at less speed than shaft 10. This is true at low speed ratio since the drive is through the underdrive unit and not the overdrive unit. It is true at high speed ratio since the planet gears 21 are larger than the planet gears 40 and the same ring gear 22 is used for both the underdrive and overdrive units whereby the overdrive unit causes an increase in speed ratio which is less than the decrease in speed ratio caused by the underdrive unit.

The one-way clutch 43 functions to prevent a rotation of the shaft 12 and thereby of a propeller fixed on the shaft in the forward direction without a connection with the shaft 10, whereby the shaft 12 and the propeller function as a flywheel for the shaft 10 and an engine connected with the shaft 10 to prevent a stalling of the engine, as when the engine is idling, for example, and would stall ordinarily without a flywheel. When the brake 27 is engaged, the connection between the shafts 10 and 12 is positive, that is to say, power may be transmitted through the transmission from either one of the shafts to the other without any overrunning of either of the shafts; however, when the brake 27 is disengaged, the driven shaft 12 is rotated by a power train including the one-way clutch 25, and it is apparent that the shaft 10 could not be rotated from the shaft 12 in the forward direction if no auxiliary means were provided for giving such a result, as the clutch 25 would simply overrun. When the transmission is set for driving the shaft 12 in low speed ratio, with the brake 27 being disengaged, if the shaft 12 tends to rotate at a faster speed than it is driven through the underdrive unit, the clutch 43 as such auxiliary means then engages, and the shaft 12 and a propeller thereon tend to rotate the shaft 10 with the drive being from the shaft 12 through the member 44, the clutch 43, the member 26 and the shaft 18 to the shaft 10. The one-way clutch 43, when the shaft 12 is being driven at either low or high speed ratio from shaft 10 is disengaged. This is true since at either speed ratio, as has been hereinbefore explained, the shaft 12 rotates at less speed than shaft 10.

My improved transmission is advantageously of simple construction, and it may be easily controlled. In order to change from one speed ratio to another, only the single operative stroke of either disengaging or engaging the brake 27 is necessary. The transmission furthermore provides two-way connections between the driving and driven shafts for either speed ratio, and a propeller on the output shaft may thus function as a flywheel at either speed ratio.

I wish it to be understood that I do not intend to limit my invention to the details of construction shown and described except only insofar as certain of the appended claims are specifically so limited, as it will be apparent to those skilled in the art that changes may be made without departing from the principles of the invention.

I claim:

1. In a transmission, the combination of an input shaft, an output shaft, change speed mechanism connected operatively between said shafts and providing power trains for driving said output shaft at a low and a high ratio with respect to the input shaft, said mechanism including a one-way clutch for completing the power train providing said low ratio and a brake for completing the power train providing said high ratio, and a one-way clutch directly between said shafts whereby said output shaft may drive said input shaft when the transmission is conditioned for either high or low ratio.

2. In a transmission, the combination of an input shaft, an output shaft, an underdrive unit connected operatively between said shafts and providing a power train for driving said output shaft, a one-way clutch for completing the power train through said underdrive unit, an overdrive unit operatively connectible between said input shaft and said underdrive unit, and a one-way clutch directly between said shafts whereby said output shaft may drive said input shaft at a one to one ratio.

3. In a transmission, the combination of an input shaft, an output shaft, an underdrive unit operatively connected between said shafts for providing a low speed ratio and including a stationary sun gear, a ring gear, means for driving said ring gear from said input shaft, a planet gear in mesh with the sun and ring gears and a planet gear carrier connected with said output shaft, and an overdrive unit including a second planet gear connectible operatively between said input shaft and said ring gear for driving the ring gear at an overspeed and driving through said underdrive unit with its said sun gear being stationary for providing a high speed ratio.

4. In a transmission, the combination of an input shaft, an output shaft, an underdrive unit connected operatively between said shafts and including a stationary sun gear, a ring gear, means for driving said ring gear from said input shaft, said means including an overrunning clutch, a planet gear in mesh with the sun and ring gears and a planet gear carrier connected with said output shaft, and an overdrive unit including a ring gear connected with the ring gear of said underdrive unit, a second sun gear, a selectively operable brake for said last-named sun gear, a planet gear in mesh with the sun and ring gears of the overdrive unit and a planet gear carrier for the planet gear of the overdrive unit and connected with said input shaft, said overdrive unit being effectively connectible between said input shaft and said underdrive unit to drive through the latter unit with the sun gear of the latter unit being stationary for providing a high speed ratio.

5. In a transmission, the combination of an input shaft, an output shaft, an underdrive unit connected operatively between said shafts for providing a low speed ratio and including a stationary sun gear, a ring gear, a one-way clutch between the input shaft and ring gear for driving the ring gear, a planet gear in mesh with the sun and ring gears and a planet gear carrier connected with said output shaft, a one-way clutch between said shafts whereby said output shaft may drive said input shaft, and an overdrive unit connectible operatively between said input shaft and said ring gear for providing a high speed ratio.

6. In a transmission, the combination of an input shaft, an output shaft, an underdrive unit connected operatively between said shafts to provide a low speed ratio and including a stationary sun gear, a ring gear, a one-way clutch between the input shaft and ring gear for driving the ring gear, a planet gear in mesh with the sun and ring gears and a planet gear carrier connected with said output shaft, a one-way clutch between said shafts whereby said output shaft may drive said input shaft, and an overdrive unit for driving said ring gear at a faster speed than it is driven through said first-named one-way clutch and providing a high speed ratio between said shafts, and a brake for making said overdrive unit effective.

7. In a transmission, the combination of an input shaft, an output shaft, an underdrive unit connected operatively between said shafts and including a stationary sun gear, a ring gear, a one-way clutch between the input shaft and ring gear for driving the ring gear, a planet gear in mesh with the sun and ring gears and a planet gear carrier connected with said output shaft, a one-way clutch between said shafts whereby said output shaft may drive said input shaft, and an overdrive unit connectible operatively between said input shaft and said ring gear and including a ring gear connected with said first-named ring gear, a sun gear, a planet gear in mesh with the sun and ring gears of the overdrive unit, and a carrier for said last-named planet gear and connected with said input shaft, and a brake for the sun gear of the overdrive unit for making the overdrive unit effective.

8. In a transmission, the combination of an input shaft, an output shaft, a change speed unit connected operatively between said shafts and providing power trains for driving said output shaft at two different speeds both of which are less than the speed of the input shaft, a one-way clutch for completing the one of said power trains for driving said output shaft at its lower speed and a brake for making effective the other of said power trains, and a one-way clutch connected between said shafts whereby said output shaft may drive said input shaft.

CARL J. CONKLE.